(12) United States Patent
Migliorati

(10) Patent No.: US 7,938,142 B2
(45) Date of Patent: May 10, 2011

(54) FIRING VALVE

(75) Inventor: Genio Migliorati, Bergamo (IT)

(73) Assignee: Larix S.r.l., Bergamo (IT)

( * ) Notice: Subject to any disclaimer, the term of this patent is extended or adjusted under 35 U.S.C. 154(b) by 853 days.

(21) Appl. No.: 11/913,800

(22) PCT Filed: May 2, 2006

(86) PCT No.: PCT/EP2006/004079
§ 371 (c)(1),
(2), (4) Date: Nov. 7, 2007

(87) PCT Pub. No.: WO2006/119889
PCT Pub. Date: Nov. 16, 2006

(65) Prior Publication Data
US 2009/0101853 A1    Apr. 23, 2009

(30) Foreign Application Priority Data
May 10, 2005  (IT) .............................. BG2005A0019

(51) Int. Cl.
*F16K 11/052* (2006.01)
(52) U.S. Cl. .................................. 137/625.44; 251/61.1
(58) Field of Classification Search ............. 137/625.28, 137/625.44, 854; 251/25, 61.1, 61.2
See application file for complete search history.

(56) References Cited

U.S. PATENT DOCUMENTS

| 2,638,127 | A |   | 5/1953  | Griswold |
|-----------|---|---|---------|----------|
| 3,856,046 | A | * | 12/1974 | Brown et al. ............. 137/625.28 |
| 4,181,151 | A | * | 1/1980  | Ensign ...................... 137/625.28 |
| 4,624,442 | A | * | 11/1986 | Duffy et al. .................. 251/61.1 |
| 4,986,164 | A | * | 1/1991  | Crutcher .......................... 91/461 |
| 5,090,659 | A |   | 2/1992  | Bronnert |
| 5,400,824 | A | * | 3/1995  | Gschwendtner et al. 137/625.28 |
| 6,986,365 | B2 | * | 1/2006 | Henning et al. ......... 137/625.28 |
| 7,438,090 | B2 | * | 10/2008 | Steele ........................... 137/854 |

FOREIGN PATENT DOCUMENTS

| DE | 1 092 221 | 11/1960 |
|----|-----------|---------|
| EP | 0 423 572 | 4/1991  |
| FR | 2 831 079 | 4/2003  |
| GB | 2 130 183 | 5/1984  |

* cited by examiner

*Primary Examiner* — John Fox
(74) *Attorney, Agent, or Firm* — Oblon, Spivak, McClelland, Maier & Neustadt, L.L.P.

(57) ABSTRACT

A valve for generating a flow of pressurized fluid in response to a command, including: a discharge conduit for discharging the pressurized fluid; a valve body surrounding the discharge conduit; a chamber that connects the discharge conduit to the valve body; a cover covering the discharge conduit and forming the chamber; and a flexible membrane positioned within the chamber. The cover includes an access hole for charging the valve body with the pressurized fluid, and for commanding the discharge of the pressurized fluid. The discharge conduit includes a grid in that part thereof that communicates with the chamber. The flexible membrane is fixed to the center of the grid.

9 Claims, 1 Drawing Sheet

FIRING VALVE

The present invention relates to a firing valve or rapid discharge valve for the fluidification of granular and pulverulent material in accordance with the introduction to the main claim.

In the state of the art, in preparing cements or agglomerates of various types, granular or pulverulent materials are used, fed from hoppers or silos.

These materials often tend to undergo compaction and create solid lumps or bridges which hinder or even prevent material outflow.

These solid lumps are generally disintegrated and their constituent materials fluidified by powerful jets of air or other compressed gases or fluids using a technique known as "firing".

This technique instantaneously feeds a large quantity of compressed fluid, for example air or nitrogen, at high pressure into the vicinity of these solid lumps, to produce impact waves which disintegrate them.

The fluid quantity introduced must be such as to completely disperse its kinetic energy into the material present in the silo or hopper.

Current firing valves comprise a valving element, generally a piston, which violently strikes against a counteracting member, with the result that with the passage of time it wears to hence cause a reduction in the seal.

For example, patent application No. BG2001A000037, in the name of the present applicant, describes a firing valve comprising interchangeable parts. This patent includes a hoeing piston which during its movement strikes violently against a discharge section and a closure cover. The metal piston is bulky and renders the valve heavy and costly.

Moreover the piston has to be guided in its movement while at the same time ensuring a lateral seal.

Valves are known using flexible membranes, for example from U.S. Pat. No. 5,090,659 and EP 423 572. Such valves are restrained at the sides of the valve, or comprise means for guiding the membrane during its movements.

An object of the present invention is therefore to provide a firing valve which enables the aforesaid drawbacks to be overcome, a particular object being to provide a firing valve which is light and of low cost.

Another object is to achieve lesser wear and hence an improvement in the seal with time.

Said objects are attained by a firing valve, the inventive characteristics of which are defined in the accompanying claims.

The invention will be more apparent from the ensuing detailed description of a preferred embodiment thereof, provided by way of non-limiting example with reference to the accompanying drawings, in which.

Figure 1:
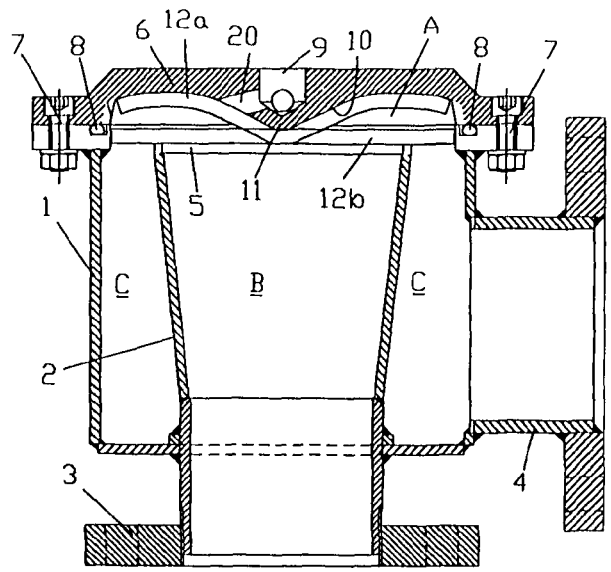
FIG. 1 is a longitudinal section through the valve according to the invention with the valving element raised.
Figure 2:
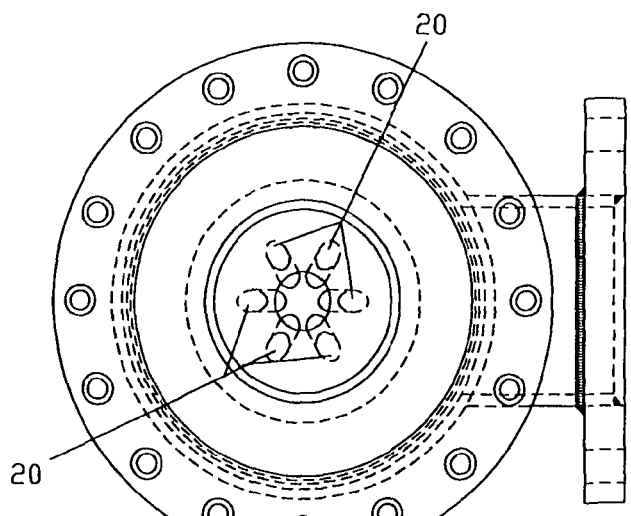
FIG. 2 shows the valve seen from above at the level of the cover.
Figure 3:
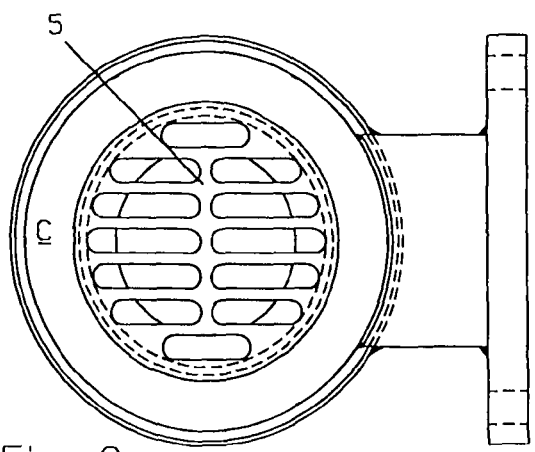
FIG. 3 shows the valve seen from above, at the level of the grid.

With reference to the accompanying figures, the firing valve of the invention can be seen to comprise a cylindrical valve body containing an outflow conduit 2, which opens below the valve body 1 with a flanged end 3. The valve body 1 peripherally surrounds the entire discharge conduit 2. On one side, the valve body 1 is connected to an accumulation conduit 4, also flanged at its end, which serves to connect the valve body to a local compressed air receiver, not shown for simplicity. A grid 5 is present on the upper end of the discharge conduit Besides being as shown in the figures, the grid 5 can also be in the form of a circular ring supporting two rods positioned along two diameters of the ring, to form a cross. A cover 6 upperly closes the valve and is securely fixed to the valve body 7 by bolts. The seal between the valve body and cover is provided by the gasket 8. The cover 6 presents an access hole 9 and has its inner surface 10 axially symmetrical and is shaped to provided a central cusp which extends towards the valve interior and degrades outwardly with a gradually smaller slope. The inner surface 10 of the cover presents a substantially continuous profile without sudden changes in slope, the cusp 11 being rounded.

The distance between the inner surface 10 of the cover 6 and the underlying grid 5 is a minimum at the centre corresponding to the cusp 11 and gradually increases away from the centre.

The access hole 9 leads to the chamber A via a series of holes 20 disposed radially.

Below the cover 6 and above the grid 5 there is a valving element 12 formed from a flexible but robust circular membrane, for example made of rubber, polyurethane, viton, various elastomers, or harmonic steel, with a hardness between 50 and 100 Shore.

This is represented in its raised or open position by the reference numeral 12a and in its closed position by the reference numeral 12b.

Said valving element 12 is pressed, and hence constrained, at its centre against the grid 5 by the cusp 11 of the cover 6. It is hence restricted centrally, whereas it is free to flex at its outer edge.

Consider a chamber A defined by the area within which the valving element 12 can move, i.e. between the cover 6 and the upper limit of the valve body 1 and of the grid 5 positioned at the end of the discharge conduit 2 (elements mutually aligned horizontally); a chamber B defined by the discharge conduit 2; and a chamber C defined by the area between the valve body 1 and the discharge conduit 2.

When in its horizontal position 12b, said valving element 12 closes the discharge conduit 2, such as to separate the chamber B from the chamber C of the valve body 1 surrounding it.

When in its position 12a adjacent to the inner surface 10, said valving element 12 connects the chambers B and C together via the chamber A.

The flange of the valve body 1 can be seen outside it and the grid inside it, this latter being either integrated into the casting or lodged on the upper end of the discharge conduit 2.

The cusp 11 is of a size such as to press the valving element 12 at its centre against the grid 5.

The valve operation comprises two stages: a charging stage and a discharge stage.

In the charging stage the pressurized fluid enters the chamber A through the access holes 9 and 20 to press on the valving element 12 which, consisting of a flexible membrane and resting on the grid 5, closes the discharge conduit 2 by flexing in proximity to its outer edge as a result of the fluid pressure, to allow the arriving fluid to pass into the chamber C and then into the accumulation conduit 4.

Alternatively, a small passage hole can be provided in the valving element 12 to connect together the chambers A and C when the valving element is in the position 12b.

By this means the fluid enters the chamber A and flows through the accumulation conduit 4 into a vessel (not shown) for containing fluid at high pressure, in a quantity sufficient for one firing discharge The fluid continues to flow and accumulate in the vessel until the pressure equals that of the feed main.

On termination of the charging stage, with the internal pressure of the accumulation conduit 4 equaling the feed pressure, the valving element 12 assumes its flat rest position 12b, to properly adhere to the grid 5 and to the outer edge of the conduit 2 by the effect of the pressure difference between the upper surface of the valving element 12, and with its lower surface in contact with the discharge conduit 2 where pressurized air is not present.

When rapid fluid discharge is required, the chamber A is emptied with rapid unloading, or a vacuum is applied. This is done by applying a vacuum through the access holes 9n and 20, which communicate directly with the chamber A. The holes 9 and 20 are normally connected to a compressor which provides compressed air (for example at about 10 bar) to charge the local receiver and maintain it charged. When the valve is operated, this circuit is put under vacuum by known means. The edge of the valving element 12, of circular ring shape, is thrust upwards by the pressure, against the inner surface 10 of the cover 6 into its position 12a, by the nullifying of the counter-pressure exerted in the chamber A, to close the holes 20 and act as a non-return valve.

When normal pressure returns through the holes 9 and 20, the valving element 12 returns to its position 12b to recharge the local receiver connected to the accumulation conduit 4 of the valve body 1.

The movement of the valving element 12 into the position 12a is instantaneous, and with the valving element in this position the pressurized fluid arriving from the accumulation conduit 4 pours into the chamber C, then into the chamber A and finally into the chamber B, from which it is fed via the discharge conduit 2 into the region in which the agglomerated solids to be fluidified have formed.

The movement of the valving element 12 is instantaneous, hence the discharge of pressurized fluid through the discharge conduit 2 is able to originate impact waves able to crush and fluidify the compacted agglomerates.

According to the present invention, an increase in the rate of opening of the discharge conduit is obtained due to the reduced volume of the piloting chamber A, and due to the lightness of the valving element 12 compared with pistons of the known art.

As the valving element 12 consists of a flexible membrane and is of negligible inertia, the valve is very compact, lightweight, quick in opening the valving element and free of the friction problems generally found in a heavy piston which slides quickly within a cylinder.

The membrane valving element 12 can be fixed at its centre, for example by a bolt between a removable grid and the internal cusp.

An advantageous characteristic of the invention is that by fixing the valving element 12 at its centre, when its edge is raised a large passage cross-section is opened for rapid discharge of the pressurized fluid into the discharge conduit 2. At the same time the diameter of the valving element 12, and hence of the valve, remains small.

For example, if the valving element 12 were fixed along its outer circular edge, to achieve the same passage cross-section a much greater circumference would be required, with consequent increase in the size of the valving element 12 and of the entire valve body which, being of metal, would be of considerably greater weight.

The valving element 12 must be fixed to some point of the valve, and/or be guided during its stroke, otherwise it could become displaced from its optimal seat and be positioned un a manner not enabling it to perform the operations required. By fixing it at its centre, considerable advantages are achieved, as aforestated.

Another advantageous characteristic is that the grid 5 can be simply lodged on and not made in one piece with the valve body or with the discharge conduit 2. This allows a simpler construction for the valve.

As an alternative to the central fixing of the valving element 12, the fixing can be transverse along a diameter of the valving element 12, and the cover 6 instead of having a central cusp could be of gull wing shape.

The invention claimed is:

1. A valve for generating a flow of pressurized fluid in response to a command, comprising:
    a discharge conduit for discharging said pressurized fluid;
    a valve body surrounding said discharge conduit;
    a chamber which connects said discharge conduit to said valve body;
    a cover covering said discharge conduit and forming said chamber; and
    a flexible membrane positioned within said chamber,
    wherein said cover comprises an access hole for charging said valve body, wherein said pressurized fluid flow in said chamber through said access hole, pressing on said flexible membrane, which is closing said discharge conduit and is flexing in proximity to its outer edge, allows said pressurized fluid to flow into said valve body, and for commanding the discharge of said pressurized fluid,
    wherein said discharge conduit comprises a grid in a part thereof that communicates with said chamber, and
    wherein said flexible membrane is fixed to the center of said grid.

2. A valve as claimed in claim 1, wherein said valve body is connected to a local receiver of said pressurized fluid.

3. A valve as claimed in claim 1, wherein said pressurized fluid is compressed air.

4. A valve as claimed in claim 1, wherein said flexible membrane is fixed between the center of said grid and a central cusp of said cover by a bolt, said grid being separated from said valve body.

5. A valve as claimed in claim 1, wherein said cover presents an inner surface with a central cusp that projects into said chamber and retains said flexible membrane against the center of said grid.

6. A valve as claimed in claim 1, wherein, when in its rest position, said flexible membrane closes said discharge conduit and enables said pressurized fluid to flow from said access hole to said valve body.

7. A valve as claimed in claim 1, wherein said flexible membrane, in response to said command in a form of a presence of a vacuum through said access hole, makes said valve body accessible to said discharge conduit.

8. A valve as claimed in claim 1, wherein said flexible membrane is fixed along a diameter of said grid.

9. A valve as claimed in claim 1, wherein said flexible membrane has a hardness between 50 and 100 Shore.

* * * * *